United States Patent
Abdel-Fattah et al.

(10) Patent No.: US 10,719,624 B2
(45) Date of Patent: Jul. 21, 2020

(54) SYSTEM FOR HIDING SENSITIVE MESSAGES WITHIN NON-SENSITIVE MEANINGFUL TEXT

(71) Applicant: International Business Machines Corporation, Armonk, NY (US)

(72) Inventors: Ahmed I. Abdel-Fattah, Cairo (EG); Ossama S. Emam, Mohandessen (EG)

(73) Assignee: International Business Machines Corporation, Armonk, NY (US)

( * ) Notice: Subject to any disclaimer, the term of this patent is extended or adjusted under 35 U.S.C. 154(b) by 47 days.

(21) Appl. No.: 14/868,463

(22) Filed: Sep. 29, 2015

(65) Prior Publication Data
US 2017/0091480 A1 Mar. 30, 2017

(51) Int. Cl.
*G06F 21/00* (2013.01)
*G06F 21/62* (2013.01)
*H04L 29/06* (2006.01)
*G06F 21/60* (2013.01)
*H04W 12/02* (2009.01)

(52) U.S. Cl.
CPC .......... *G06F 21/6245* (2013.01); *G06F 21/60* (2013.01); *H04L 63/0428* (2013.01); *H04W 12/02* (2013.01)

(58) Field of Classification Search
CPC .................................................. G06F 21/6245
USPC .......................................................... 726/30
See application file for complete search history.

(56) References Cited

U.S. PATENT DOCUMENTS

| 7,167,825 | B1 * | 1/2007 | Potter ..................... H04L 9/065 380/42 |
| 7,646,868 | B2 | 1/2010 | Vaughn |
| 8,694,801 | B2 | 4/2014 | Emam et al. |
| 9,489,371 | B2 * | 11/2016 | Bonnet ................... G06K 9/723 |
| 9,727,748 | B1 * | 8/2017 | Yaeger .................... H04L 63/10 |
| 10,032,046 | B1 * | 7/2018 | Hayashi ............. G06F 21/6227 |
| 2003/0154386 | A1 * | 8/2003 | Wittkotter ........... G06F 21/6218 713/193 |
| 2004/0078595 | A1 * | 4/2004 | Kent, Jr. .............. G06Q 10/107 713/160 |

(Continued)

FOREIGN PATENT DOCUMENTS

IN 6838/CHE/2014 A 1/2015

OTHER PUBLICATIONS

Chapman, Mark, and George Davida. "Hiding the hidden: A software system for concealing ciphertext as innocuous text." International Conference on Information and Communications Security. Springer, Berlin, Heidelberg, 1997.*

(Continued)

*Primary Examiner* — Harris C Wang
(74) *Attorney, Agent, or Firm* — Isaac Gooshaw (57) ABSTRACT

The method includes receiving, by one or more computer processors, a first text, wherein at least a portion of the received first text is confidential. The method further includes identifying, by one or more computer processors, an intended recipient of the received first text. The method further includes identifying, by one or more computer processors, a first conversion model, which corresponds to the intended recipient. The method further converting, by one or more computer processors, the received first text into a third text that does not include confidential text based upon the identified first conversion model.

20 Claims, 4 Drawing Sheets

(56) References Cited

U.S. PATENT DOCUMENTS

| | | | | |
|---|---|---|---|---|
| 2007/0078784 A1* | 4/2007 | Donovan | ............... | G16H 10/60 |
| | | | | 705/71 |
| 2007/0094594 A1* | 4/2007 | Matichuk | .............. | G06F 40/253 |
| | | | | 715/205 |
| 2008/0069340 A1* | 3/2008 | Vaughn | ..................... | H04L 9/06 |
| | | | | 380/28 |
| 2009/0089663 A1* | 4/2009 | Rebstock | .............. | G06F 40/166 |
| | | | | 715/253 |
| 2012/0239380 A1* | 9/2012 | Cumby | ............... | G06F 17/2785 |
| | | | | 704/9 |
| 2014/0016814 A1* | 1/2014 | Baughman | .............. | G06F 21/16 |
| | | | | 382/100 |
| 2014/0025952 A1* | 1/2014 | Marlow | .............. | H04L 63/0428 |
| | | | | 713/168 |
| 2014/0195884 A1* | 7/2014 | Castelli | ................. | G06F 16/285 |
| | | | | 715/201 |
| 2014/0280173 A1* | 9/2014 | Scholtes | ........... | G06F 17/30705 |
| | | | | 707/740 |
| 2014/0358923 A1* | 12/2014 | Nunez | ................... | G06F 16/353 |
| | | | | 707/737 |
| 2015/0379303 A1* | 12/2015 | LaFever | .............. | G06F 21/6218 |
| | | | | 726/28 |
| 2017/0126631 A1* | 5/2017 | Vikramaratne | ..... | H04L 63/0428 |

OTHER PUBLICATIONS

Chand, et al., "Exploiting Linguistic Features in Lexical Steganography: Design and Proof-of-Concept Implementation", Proceedings of the 39th Hawaii International Conference on System Sciences, © 2006 IEEE, pp. 1-10.

Chapman, et al., "A Practical and Effective Approach to Large-Scale Automated Linguistic Steganography", Date Captured: May 8, 2015, 11 pages.

Desoky, A., "Matlist: Mature linguistic steganography methodology", Security and Communication Networks, vol. 4, Issue 6, Jun. 2011, 2 pages.

* cited by examiner

SYSTEM FOR HIDING SENSITIVE MESSAGES WITHIN NON-SENSITIVE MEANINGFUL TEXT

BACKGROUND OF THE INVENTION

The present invention relates generally to securely sending text using a computing device. More specifically the invention relies on steganographic principles to hide sensitive text within innocuous text.

Steganography is the art and science of encoding hidden messages in such a way that no one, apart from the sender and the intended recipient, suspects the existence of sensitive information within the text. Steganography is a form of security through obscurity. Generally, the hidden messages will appear to be, or be part of, something else such as, images, articles, shopping lists, or some other masked text.

Steganography includes the concealment of information within computer files. In digital steganography, electronic communications may include steganographic coding inside of a transport layer, such as a document file, image file, program or protocol.

SUMMARY

Aspects of the present invention disclose a method, computer program product, and system for hiding confidential text within non-confidential text. The method includes receiving, by one or more computer processors, a first text, wherein at least a portion of the received first text is confidential. The method further includes identifying, by one or more computer processors, an intended recipient of the received first text. The method further includes identifying, by one or more computer processors, a first conversion model, which corresponds to the intended recipient. The method further converting, by one or more computer processors, the received first text into a third text that does not include confidential text based upon the identified first conversion model.

DETAILED DESCRIPTION

Embodiments of the present invention allow for a user to create sensitive text and convert the sensitive text to meaningful non-sensitive text when sharing the text with another user. For the purposes of this application it should be recognized that sensitive text is the same as confidential text, and non-sensitive text is the same as non-confidential text.

Some embodiments of the present invention recognize that the methods through which users send sensitive messages can present problems. Cryptography is the current method of sending sensitive information to another user. Cryptography is the art of protecting information by transforming the information (e.g., encrypting the information) into an unreadable format called cipher text. Encrypted messages are conspicuous and alert an unintended recipient that the nature of the communication is sensitive. Embodiments of the present invention create a meaningful innocent message, using mapping models that can be shared between users, instead of generating an unreadable message that would provoke a hacker, or unintended recipient, to start working to decrypt the message.

Implementation of embodiments of the invention may take a variety of forms, and exemplary implementation details are discussed subsequently with reference to the figures.

Figure 1:
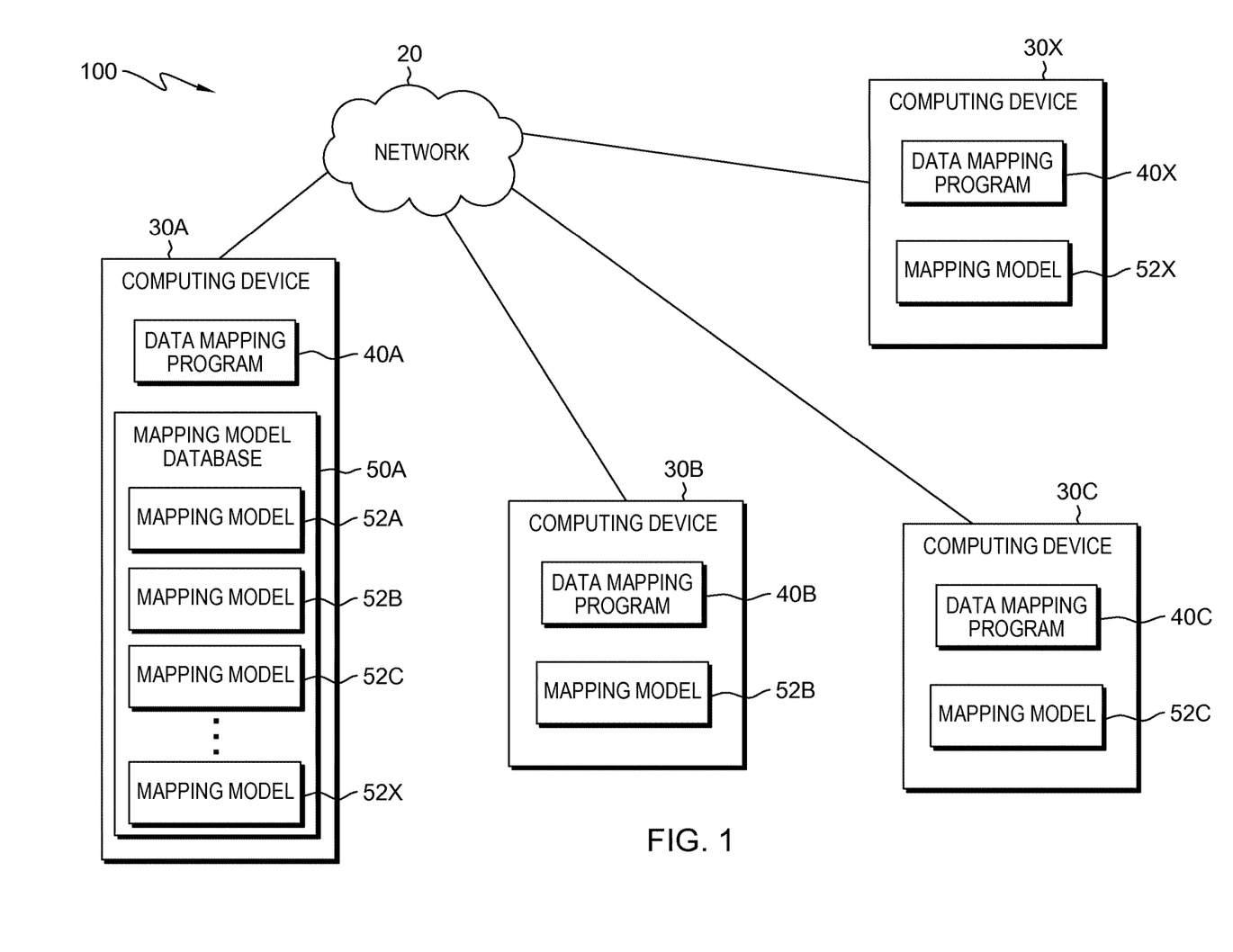
FIG. 1 is a functional block diagram illustrating a distributed data processing environment, providing a broad overview of the conversion of text using mapping models, in accordance with one embodiment of the present invention.

The present invention will now be described in detail with reference to the Figures. FIG. 1 depicts the computer environment in which the invention takes place in accordance with one embodiment of the present invention. FIG. 1 provides only an illustration of one embodiment and does not imply any limitations with regard to the environment in which different embodiments may be implemented. Many modifications to the depicted environment may be made by those skilled in the art without departing from the scope of the invention as recited by the claims.

In the depicted embodiment, computing system 100 includes, computing devices 30 A, 30 B, 30 C, and 30 X, data mapping programs 40 A, 40 B, 40 C, and 40 X, and mapping models 52 A, 52 B, 52 C, and 52 X. Computing devices 30 A, 30 B, 30 C, and 30 X may be connected via network 20.

Network 20 may be a local area network (LAN), a wide area network (WAN) such as the Internet, a cellular data network, any combination thereof, or any combination of connections and protocols that will support communications between computing devices 30 A, 30 B, 30 C, and 30 X, in accordance with embodiments of the invention. Network 20 may include wired, wireless, or fiber optic connections. Computing system 100 may include additional computing devices, servers, or other devices, not shown, that are able to communicate with computing devices 30 A, 30 B, 30 C, and 30 X via network 20.

Computing devices 30 A, 30 B, 30 C, and 30 X may be a desktop computer, laptop computer, netbook computer, or tablet computer. In general, computing devices 30 A, 30 B, 30 C, and 30 X may be any electronic device or computing system capable of processing program instructions, sending and receiving data, and communicating with computing devices 30 A, 30 B, 30 C, and 30 X via network 20. Computing devices 30 A, 30 B, 30 C, and 30 X may be identical or different computing devices, but computing devices 30 A, 30 B, 30 C, and 30 X are both capable of supporting data mapping programs 40 A, 40 B, 40 C, and 40 X. In the depicted embodiment, computing devices 30 A, 30 B, 30 C, and 30 X contain data mapping programs 40 A, 40 B, 40 C, and 40 X respectively, and mapping models 52 A, 52 B, 52 C, and 52 X respectively.

Data mapping programs 40 A, 40 B, 40 C, and 40 X generate mapping models to convert sensitive text into generic text. In some embodiments, data mapping programs 40 A, 40 B, 40 C, and 40 X may include subprograms that perform specific tasks, such as generating models, applying the generated models to text, creating non sensitive text, etc. In other embodiments, data mapping programs 40 A, 40 B, 40 C, and 40 X may be a representation of independent programs located on the same computing device for generating models, applying the generated models to text, creating non sensitive text, etc. Data mapping programs 40 A, 40 B, 40 C, and 40 X are the first step in a wide variety of data integration tasks. Data mapping programs 40 A, 40 B, 40 C, and 40 X may build mapping models for different domains or genres such as sports, news, weather, movies, books, etc. Data mapping is the process of creating data element mappings between two distinct data models. In some embodiments, data mapping programs 40 A, 40 B, 40 C, and 40 X may send data to another computing device, via network 20, which will be converted into another version by a user on said alternative computing device.

In one embodiment, data mapping programs 40 A, 40 B, 40 C, and 40 X retrieve, or receive, a large amount of text through network 20, which enables data mapping programs 40 A, 40 B, 40 C, and 40 X to generate generic text. In another embodiment, data mapping programs 40 A, 40 B, 40 C, and 40 X acquire text from a personal database that includes email information related to the user of data mapping programs 40 A, 40 B, 40 C, and 40 X. In yet another embodiment, data mapping programs 40 A, 40 B, 40 C, and 40 X may acquire text from an external database that may reside on a server, computing device, or independently as a standalone database that is capable of communicating with data mapping programs 40 A, 40 B, 40 C, and 40 X and computing devices 30 A, 30 B, 30 C, and 30 X via network 20.

Mapping model database 50 A may be a repository that may be written and/or read by data mapping programs 40 A, B, C, and X, and mapping models 52 A, B, C, and X. In some embodiments, mapping models 52 A, B, C, and X may allow an administrator, or other user, to define the data and write the data to mapping model database 50 A. Data relevant to the communication of mapping model database 50 A, and mapping models 52 A, B, C, and X may be stored to mapping model database 50 A.

Mapping models 52 A, 52 B, 52 C, and 52 X house, or store, a collection of objects that specify the text transformations (e.g., text transformations that are required) to migrate from one version of a model to another version of the model. In one embodiment, mapping model database 50 A provides a step (e.g., applying a value transformation on a property) in the migration of data from one attribute to a different attribute. In another embodiment, mapping models 52 A, 52 B, 52 C, and 52 X may directly facilitate the fusion of unstructured text to form coherent phrases and sentences. Mapping models 52 A, 52 B, 52 C, and 52 X facilitate the migration of sensitive text to innocuous text, and/or migrate innocuous text to sensitive text.

Figure 2:
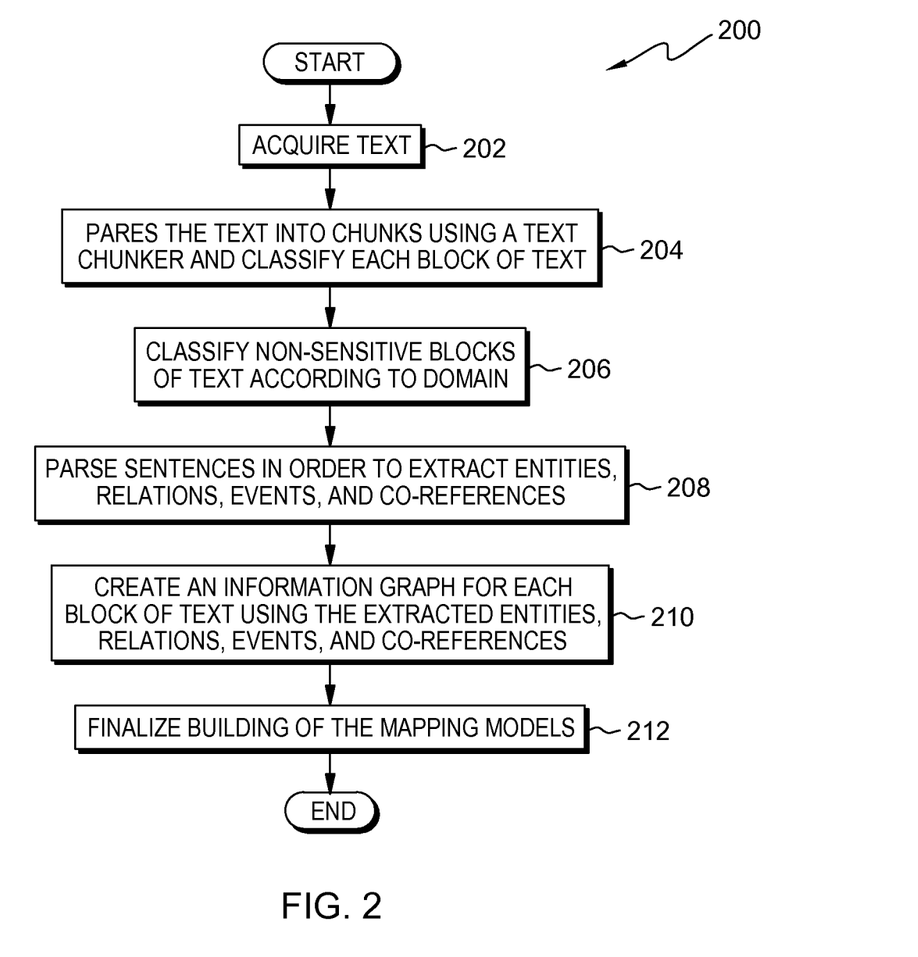
FIG. 2 is a flowchart depicting operational steps of a program generating mapping models, in accordance with one embodiment of the present invention.

FIG. 2 depicts a flowchart of the steps program 200 executes within computing devices 30 A, 30 B, 30 C, and 30 X in computing system 100, of FIG. 1, for the generation of mapping models. Program 200 is a function of data mapping program 40, in accordance with one embodiment of the present invention. In some embodiments, program 200 may acquire a large amount of text, then utilize a text chunker (as known by a person skilled in the art) to segment blocks of the large amount of text into comprehensive sets of sentences. Then, program 200 may classify the text in the comprehensive sets of sentences, extracts entities, relations, events, and co-references from the comprehensive sets of sentences and maps the entities, relations, events, and co-references to the corresponding text. Then, program 200 may determine a domain to generate a mapping model.

In step 202, program 200 acquires text. Text can be a sentence, a paragraph, a message, or any combination of letters that program 200 recognizes as words. In one embodiment, program 200 may identify previously created documents, or search for documents on the Internet. For example, program 200 identifies saved files on computing device 30A. In another example, program 200 gathers text documents on the Internet via network 20.

In step 204, program 200 parses the text into chunks using a text chunker and classifies each block of text. Each "chunk" represents a comprehensive set of sentences that can tell a story. In one embodiment, program 200 commences to deconstruct one or more paragraphs into coherent blocks of text. For example, each block of text represents a comprehensive set of sentences that tells a story. Program 200 classifies the blocks of text so the blocks of text may be tagged as sensitive or non-sensitive using a sensitivity classifier. A statistical sensitivity classifier may be constructed using tagged sensitive/non-sensitive information. In one embodiment, program 200 utilizes sensitive/non-sensitive keywords to trawl the blocks of text in order to collect tagged data. In another embodiment, program 200 segments the text, and classifies the text, based upon a sensitivity classifier, as sensitive. For example, a statistical sensitivity classifier, built into program 200, classifies keywords as sensitive if the word has been tagged as such. Program 200 searches for certain tagged keywords deemed sensitive. In an example, the words credit card, names, financial words, or help would be listed among tagged sensitive keywords. In yet another embodiment, program 200 segments the text and classifies the text as non-sensitive.

In step 206, program 200 classifies non-sensitive blocks of text according to domain. In one embodiment, blocks of text are sensitive, with no other extra tag, or non-sensitive with another tag that represents its domain. Program 200 uses a domain classifier to identify text that has not been tagged as sensitive and/or tagged according to domain. Program 200 parses out tagged sensitive keywords and simultaneously parses out tagged non-sensitive keywords from blocks of text. For example, program 200 classifies non-sensitive text, which is also tagged, as corresponding to a certain domain. Program 200 recognizes, from the extracted text, certain domains that are tagged as non-sensitive. Topics or domains in the large blocks of text, such as news, sports, cinema, fashion, or classic automobile, are parsed out of the paragraphs and organized on an information graph. In other words, program 200 classifies non-sensitive chucks according to domain (e.g., news, sports, etc.) using a domain classifier. Program 200 classifies chucks as either sensitive (e.g., no other extra tag), or non-sensitive (e.g., with another tag that represents domain.) In some embodiments, program 200 also arranges the tagged sensitive text on an information graph in an analogous manner.

In step 208, program 200 parses sentences in order to extract entities, relations, events, and co-references. Program 200 extracts entities, relations, co-references, and events, using information extraction techniques from the text. Unstructured text contains information, and efficiently extracting such information requires correctly parsing the sentences, identifying key text, type information, and relationship information, and performing co-reference resolution to merge information about the same entity. In some embodiments, program 200 uses information extraction techniques to delineate entities, relations, co-references, and events.

In step 210, program 200 creates an information graph for each block of text using the extracted entities, relations, events, and co-references. Program 200 groups chunks that have the same information graph pattern of tags. For instance, information graph tags may be: entity, event, entity (terminal), event, entity, entity associate, event, entity. In a detailed example the same information tag pattern/sequence can be used (e.g., Soccer forward Ulysses [entity] was playing [event] the quarter-final match [entity (terminal)] where he was kneed [event] in the back [event]. An x-ray [entity associate] on his back was performed [event] immediately by his doctor [entity]). Program 200 creates mapping models utilizing chunks of sensitive and non-sensitive text. In various embodiments, program 200 utilizes chunks that are classified as sensitive as heads in the graph. Conversely, program 200 utilizes chunks that are classified as non-sensitive as tails in a one-to-many mapping. By creating heads as sensitive and tails as non-sensitive, the sensitive chunks will point to many non-sensitive chunks per each domain.

In step 212, program 200 finalizes the building of the mapping models. In one embodiment, the information graphs of the chunks that are classified as sensitive are used as heads, and the information graphs of the chunks that are classified as non-sensitive are used as tails in a one-to-many mapping. In one embodiment, program 200 directs the sensitive blocks of text to many non-sensitive blocks of text per each domain. In another embodiment, a user chooses the domain (e.g., sports) and program 200 can map the original text, A, to a new text, B, from the chosen domain. For example, a user can have the choice to use a different conversion model for each domain, (B, C, or, X for a news domain or I, J, K for a sports domain), so a user does not have to share the same model with more than one user. In another embodiment, program 200 chooses the domain for a user. For example, program 200 selects the best sequence of words to use as an input for a user in an auto-complete like user interface.

Figure 3:
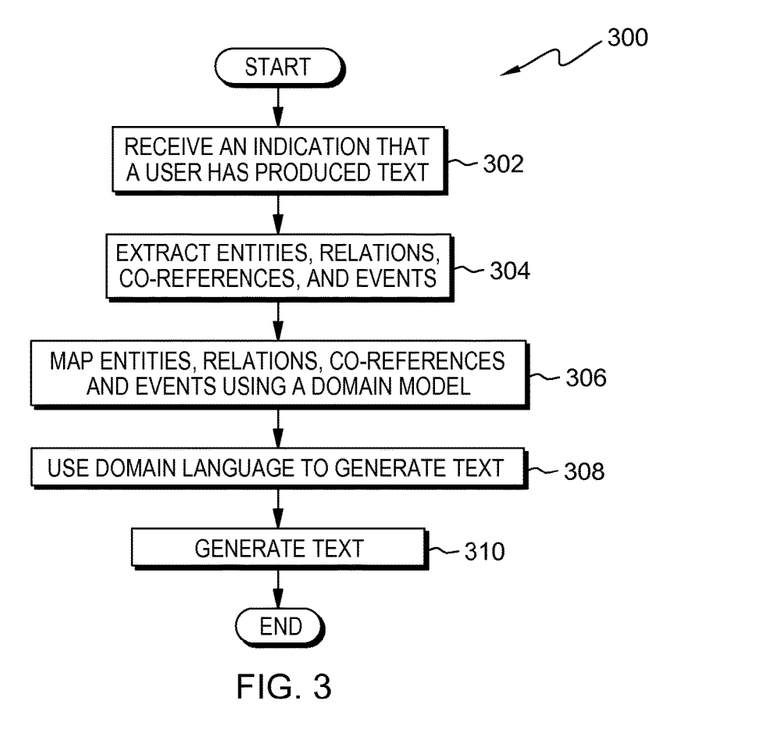
FIG. 3 is a flowchart depicting, the transformation of text from sensitive to non-sensitive, in accordance with one embodiment of the present invention.

FIG. 3 depicts a flowchart of the steps program 300 executes within computing devices 30 A and 30 B in computing system 100, of FIG. 1. Program 300 is a function of data mapping program 40, in accordance with one embodiment of the present invention for performing a computer action based on a user input of a computing system. Program 300 extracts entities, relations, events, and co-references from text A and maps the entities, relations, events, and co-references to the corresponding text to generate text B. In some embodiments, the operational steps of program 300 initiate in response to data mapping program 40 receiving input that a user has produced a text. Text A is the initial text produced by a user. Text B is the result of program 300 converting the previous text, A, into a new innocuous text, B, which is then sent to a user.

In step 302, program 300 receives an indication that a user has produced text. Text can be a sentence, a paragraph, a message, or any combination of letters that program 300 recognizes as words. In one embodiment, program 300 receives indication that a user has manually entered text (e.g., text A). In another embodiment, program 300 receives indication that a user has entered text through a copy and paste mechanism. For example, program 300 receives text input from a user physically typing. In another example, program 300 receives input from a user copy and pasting large blocks of text.

In step 304, program 300 extracts entities, relations, co-references, and events. In some embodiments, program 300 extracts information utilizing extraction techniques from the text received from a user input. Unstructured text contains information, and efficiently extracting such information includes correctly parsing the sentences, identifying key text, type information, and relationship information, and performing co-reference resolution to merge information about the same entity. In some embodiments, program 300 uses information extraction techniques to delineate entities, relations, co-references, and events. In one embodiment, program 300 segments the text into a comprehensive set of sentences. For example program 300 divides a large block of text in the form of multiple paragraphs, copied by a user, into smaller blocks that represent a comprehensive set of sentences that tell a story.

In another embodiment, program 300 segments the text entered by a user, and classifies the text based upon a sensitivity classifier, as sensitive. For example, a statistical sensitivity classifier, built into program 300, classifies keywords as sensitive if the word has been tagged as sensitive. Program 300 is trained to recognize certain tagged keywords as sensitive. Specifically the words, credit card, specific names, bank account, or help would be listed among tagged sensitive keywords.

In step 306, program 300 maps entities, relations, co-references, and events using a domain model. In various embodiments, program 300 maps entities, relations, co-references, and events to the same information in model B. In some embodiments, information mapped in model B, by mapping models 52 A and B, become new text in the next step. Information mapping is the process of mapping information extracted from the initial text to the information that will form the new text. In one embodiment, the information mapping model, in conjunction with previously stored, or newly created mapping models, is a block of text that is classified as sensitive, head, or non-sensitive, tail, in a one-to-many mapping process. The text that program 300 classifies as sensitive can be mapped to many instances of non-sensitive text on the information graph. For example, a user chooses a domain, and the user can choose different conversion models for each domain so the user doesn't have to share the same model with more than one user. In another embodiment, a user can be pointed to the best sequence of words to be used as input. For example, program 300 consults a language model during typing of the input, by a user, in an auto complete like user interface. The language model will suggest the text sequence that best corresponds with the chosen domain. In another embodiment, program 300 helps migrate the text data from one attribute to another. The initial text is migrated from one relationship, sensitive text, to another, innocuous text consistent with the chosen domain shared between two users.

In an example, User A writes or types the following text: "Hi B, John was travelling to India and lost his credit card. Please send me the credit card information so that I can report the incident." User A would like to hide the following elements in the text: First, John is traveling; Second, a credit card has been lost; Third, the a request for credit card information. Program 300 parses the text and uses information extraction techniques to identify entities, relations, events, and co-references. Program 300 efficiently extracts information in unstructured text by parsing sentences, identifying key entities, type information, and relationship information. Program 300 performs co-reference resolution to merge information about the same entity. Once program 300 extracts the information from text A, program 300 maps the information to correspondents to generate text B.

In the above example, Program 300 creates the following information graph tags. Entity, Event, Entity (Terminal).

Event, Entity, Entity Associate, Event, Entity. The information graph tags can be grouped with the following text which has the same information tag pattern/sequence during the process of building the mapping models. Brazil forward Ulysses [Entity] was playing [Event] the quarter-final match [Entity (Terminal)] where he was kneed [Event] in the back [Entity]. An x-ray [Entity Associate] on his back was performed [Event] immediately by his doctor [Entity]. In this example, a user has chosen a sports domain, specifically soccer, and the original text can be mapped to text from this domain.

For example, a user chooses a domain. The user can choose different conversion models for each domain so the user doesn't have to share the same model with more than one user. In another embodiment, a user can be pointed to the best sequence of words to use as input. For example, program 300 consults language model during typing of the input, by a user, in an auto complete like user interface. The language model can suggest the text sequence that bests corresponds with the chosen domain. In another embodiment, program 300 migrates the text data from one attribute to another. The initial text is migrated from sensitive text, to another, innocuous text consistent with the chosen domain shared between two users.

In step 308, program 300 generates text. The newly generated text has been mapped to a domain chosen by a user, or program 300. In one embodiment, program 300 has mapped the original text, containing sensitive information, to the new text through a combination of the mapping model and domain. For example, during the generation of text, new text from the original text, a statistical language model builds the text according to the domain/topic. The new text is completely different from the original text. Fluent, seamless sentences are created as a result. In another embodiment, program 300 parses out sensitive text, from the block of text, and creates the information graph. Program 300 chooses a domain for the text conversion model. For example, program 300 automatically chooses news as a domain. Program 300 creates three different versions of new text, in the same domain, from one organized head of sensitive text. In another embodiment, a user selects the domain. Program 300 parses out the sensitive text has the capacity to map this single, sensitive text head to a single domain and create numerous versions of text. In this example, a user manually selects a movie domain. Five different versions of new text, consistent with the chosen domain, are created from the single sensitive text head.

In step 310, program 300 publishes the generated text. In some embodiments, a user sends and publishes Text B through the Internet. In another embodiment, program 300 may publish Text B on the Internet without user input. In one embodiment, step 310 is optional. For example, if two users are on the same computer, no need to send any text through the internet exists. In one embodiment, program 300 sends the new text through network 20. For example, a user has previously shared the mapping model with another user. A user sends new text, altered by program 300, which has been pasted into the body of an email in a new form, to a user that has the corresponding mapping model to reconvert the new text back to the original state of the text.

Figure 4:
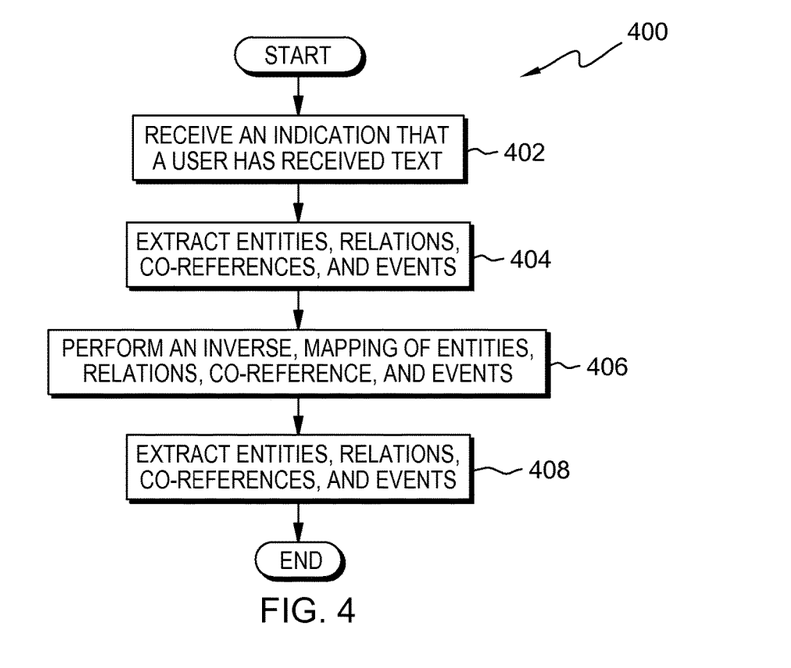
FIG. 4 is a flowchart depicting, the transformation of text from non-sensitive to sensitive, in accordance with one embodiment of the present invention.

FIG. 4 depicts a flowchart of the steps program 400 executes within computing device 30 in computing system 10, of FIG. 1, for performing a computer action based on a user input of a computing system in accordance with one embodiment of the present invention. Program 400 is a function of data mapping program 40 A or 40 B, in accordance with one embodiment of the present invention. In some embodiments, the operational steps of program 400 begin when data mapping program 40 A or 40 B receives input that a user has received converted text from the Internet.

In step 402, program 400 receives an indication that a user has received text. A user may receive the text from many sources including, but not limited to, databases and flash drives. In one embodiment, program 300 receives indication that a user has received text from the Internet. For example, the received text may be published on a webpage. The user visits the webpage and proceeds to copy and paste the text into program 400. In another embodiment, program 400 receives indication that a user has received an email. For example, program 400 receives text via an email service. A user recognizes the sender as someone who may be sending sensitive text or may have sent sensitive text in the past. In another embodiment, program 400 receives indication that a user has received a large block of text via the Internet. In another example, program 400 automatically scans the received text for information when program 400 receives the text.

In another embodiment, program 400 receives large amounts of text from a personal database and/or an external database. For example, a user copies copious amounts of text from the combination of a personal database, and an external database. In yet another embodiment, a user, using the same computer as another user, receives new text. For example, two users share the same computer, one user stores text on the shared computer. A second user identifies the stored text and proceeds to enact program 400 to read the message.

In step 404, program 400 extracts entities, relations, co-references, and events. In some embodiments, program 400 may utilize the same information extraction tool as previously discussed in FIG. 3. Program 400 extracts information from the text received from an external database, email, or personal database. Program 400 extracts the entities from a received text after manual query by a user. Program 400 uses the information extraction tool to delineate entities, relations, co-references, and events. Program 400 recognizes the message as encrypted based upon many factors. In an embodiment, program 400 recognizes the message as encrypted based upon a scan performed by the user. For example, a user manually scans all text, using program 400, from a particular user for encryption. In one embodiment, program 400 segments the text, received by a user, into a comprehensive set of sentences. For example, program 400 divides a large block of text in the form of multiple paragraphs, received by a user, into smaller blocks that represent a comprehensive set of sentences that tell a story.

In step 406, program 400 performs an inverse mapping of entities, relations, co-reference, and events. In some embodiments, program 400 performs an inverse mapping of entities, relations, co-reference, and events on the extracted information in conjunction with mapping model 52 A and 52 B. Program 400 performs the mapping process in reverse to recreate the original intended text based upon the received and converted text. The text information is mapped back using inverse information mapping that consults mapping model 52 A and 52 B. Program 400 consults mapping model 52 A and 52 B through a previously selected domain shared between two users. For example, a user types text and chooses the converted text among many alternatives based on a preferred topic. A user may copy and paste the converted text and send the converted text to another user. Program 400 consults the mapping model to convert text because a user manually queries the conversion. When decrypting a message, program 400 is able to consult mapping model 52 A and 52 B because two users share the conversion domain.

In various embodiments, only one mapping model may be shared between different users. For example, the user of computing device 30 A creates mapping model A to B and sends mapping model information to user B located on computing device 30 B. In another example, the user of computing device 30 A creates multiple mapping models (e.g., A to B, A to C, A to X) and sends the separate models to each corresponding user (e.g., computing device 30 B receives mapping model A to B, computing device 30 C receives mapping model A to C, and computing device 30 X receives mapping model A to X). Each mapping model is different and only shared with one other user, therefore each users has a key to decrypt text from a previously established connection.

In step 408, Program 400 uses language models and restores original text. Program 400 converts the sentences according to the domain shared between the two users. In another embodiment, program 400 suggests the sentence that has the highest probability of being inversely mapped from the previously converted paragraphs. For example, program 400 consults the mapping model during the inverse mapping of text input to complete the reconstitution of sensitive sentences and words in an auto complete like fashion. The inverse mapping model will suggest the sensitive text that bests corresponds with the presented domain. Program 400 helps migrate the text data from one attribute to another. The text is migrated from innocuous text back to the intended sensitive text in a manner consistent with the chosen domain shared between two users. In another embodiment, program 400 recreates text by ungrouping a received text, which has the same information tag pattern, to the information tag pattern/sequence. The text is re-created from the inverse mapping process of program 400.

Figure 5:
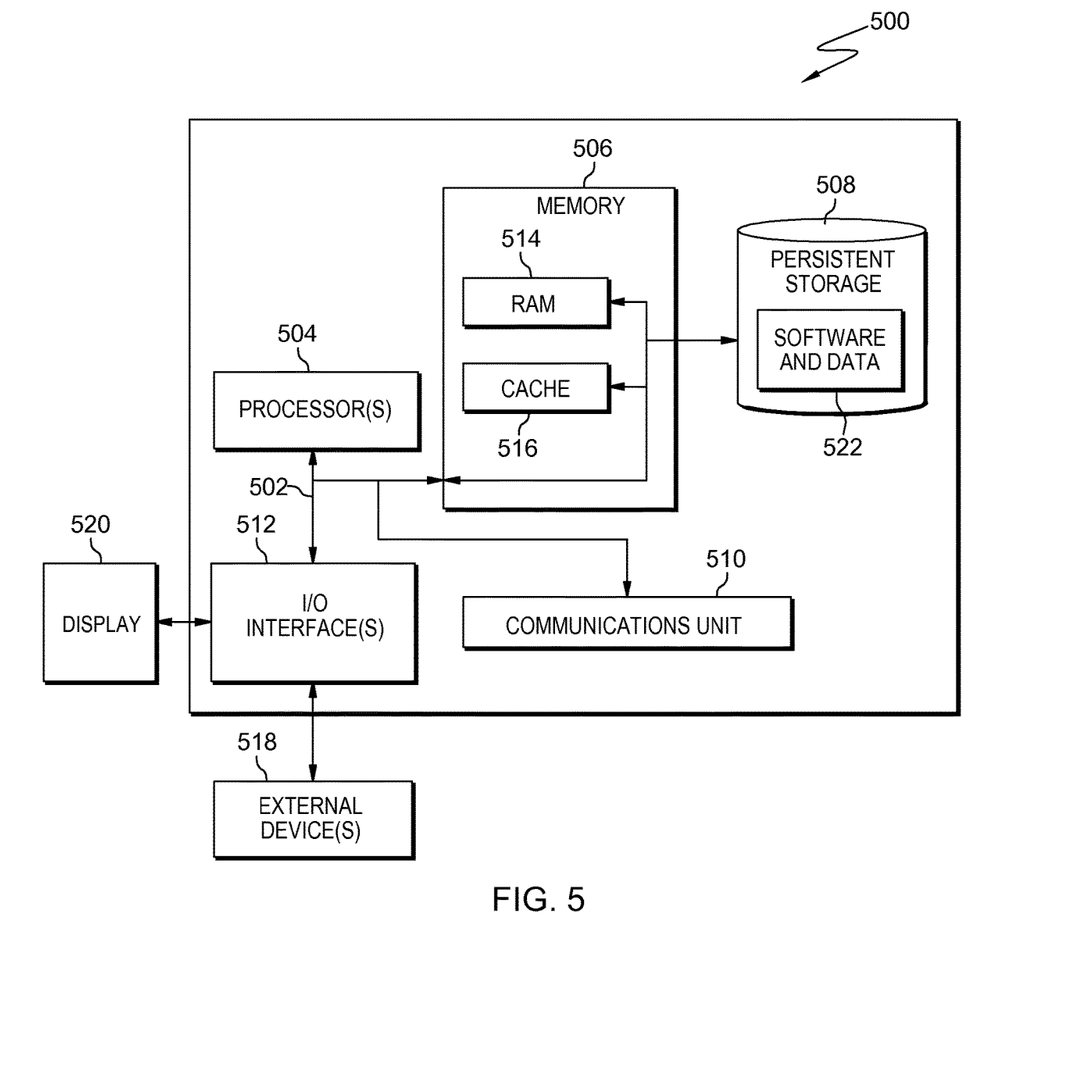
FIG. 5 depicts a block diagram of components of the computing device of FIG. 1, in accordance with another embodiment of the present invention.

FIG. 5 depicts computer system 500, which is an example of a system that includes computing devices 30 A, 30 B, 30 C and 30 X. Computer system 500 includes processors 501, cache 503, memory 502, persistent storage 505, communications unit 507, input/output (I/O) interface(s) 506 and communications fabric 504. Communications fabric 504 provides communications between cache 503, memory 502, persistent storage 505, communications unit 507, and input/output (I/O) interface(s) 506. Communications fabric 504 can be implemented with any architecture designed for passing data and/or control information between processors (such as microprocessors, communications and network processors, etc.), system memory, peripheral devices, and any other hardware components within a system. For example, communications fabric 504 can be implemented with one or more buses or a crossbar switch.

Memory 502 and persistent storage 505 are computer readable storage media. In this embodiment, memory 502 includes random access memory (RAM). In general, memory 502 can include any suitable volatile or non-volatile computer readable storage media. Cache 503 is a fast memory that enhances the performance of processors 501 by holding recently accessed data, and data near recently accessed data, from memory 502.

Program instructions and data used to practice embodiments of the present invention may be stored in persistent storage 505 and in memory 502 for execution by one or more of the respective processors 501 via cache 503. In an embodiment, persistent storage 505 includes a magnetic hard disk drive. Alternatively, or in addition to a magnetic hard disk drive, persistent storage 505 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 505 may also be removable. For example, a removable hard drive may be used for persistent storage 505. Other examples include optical and magnetic disks, thumb drives, and smart cards that are inserted into a drive for transfer onto another computer readable storage medium that is also part of persistent storage 505.

Communications unit 507, in these examples, provides for communications with other data processing systems or devices. In these examples, communications unit 507 includes one or more network interface cards. Communications unit 507 may provide communications through the use of either or both physical and wireless communications links. Program instructions and data used to practice embodiments of the present invention may be downloaded to persistent storage 505 through communications unit 507.

I/O interface(s) 506 allows for input and output of data with other devices that may be connected to each computer system. For example, I/O interface 506 may provide a connection to external devices 508 such as a keyboard, keypad, a touch screen, and/or some other suitable input device. External devices 508 can also include portable computer readable storage media such as, for example, thumb drives, portable optical or magnetic disks, and memory cards. Software and data used to practice embodiments of the present invention, e.g., mapping model database 50 A and 50 B, and mapping model 52 A and 52 B, can be stored on such portable computer readable storage media and can be loaded onto persistent storage 505 of computing device 30 A and 30 B via I/O interface(s) 506 of computing device 40. I/O interface(s) 506 also connect to display 509.

Display 509 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for hiding confidential text within non-confidential text, the method comprising:

receiving, by one or more computer processors, a text that includes (i) a first text and (ii) a second text, wherein at least a portion of the received first text is confidential and at least a portion of the received second text is non-confidential;

identifying, by one or more computer processors, an intended recipient of the received text;

determining, by one or more computer processors, one or more entities contained within (i) the received first text and (ii) the received second text;

analyzing, by one or more computer processors, the one or more entities, wherein the one or more entities comprise one or more topics;

identifying, by one or more computer processors, a first conversion model, which corresponds to text between the intended recipient and a creator of the text, wherein the conversion model is based on a non-confidential topic contained within the second text as well as the intended recipient; and converting, by one or more computer processors, the received first text into a third text that has a similar topic to the non-confidential second text topic, wherein converting replaces a confidential first text with coherent non-confidential text associated with the non-confidential topic.

2. The computer-implemented method of claim 1, the method further comprising:

receiving, by the one or more computer processors, the text that includes, one or a combination of, (i) the confidential first text and (ii) the non-confidential second text;

analyzing, by the one or more computer processors, the received text; and identifying, by the one or more computer processors, (i) the identified recipient of the text and (ii) the creator of the text.

3. The computer-implemented method of claim 1, the method further comprising:

identifying, by the one or more computer processors, the text document;

identifying, by the one or more computer processors, (i) one or more confidential first text and (ii) one or more non-confidential second text contained within the text document;

separating, by the one or more computer processors, the identified text document into (i) one or more portions of confidential first text and (ii) one or more portions of non-confidential second text;

classifying, by the one or more computer processors, (i) the one or more portions of confidential first text into one or more topics and (ii) the one or more portions of non-confidential second text into one or more topics; and generating, by the one or more computer processors, one or more text conversion models based upon, one or a combination of, (i) the separated one or more portions of confidential first text, (ii) the separated one or more portions of non-confidential text, and (iii) the classified one or more topics, wherein the one or more text conversion models use a statistical language model to create one or more versions of converted text.

4. The computer-implemented method of claim 3, wherein one or more topics are generic classifications for types of related text.

5. The computer-implemented method of claim 1, wherein converting, by the one or more computer processors, the received confidential first text into the third text that includes a non-confidential topic that is associated with the non-confidential second text based upon the identified first conversion model includes, one or a combination of:

identifying, by the one or more computer processors, a non-confidential topic for the third text associated with the non-confidential second text; and converting, by the one or more computer processors, the received first text into the third text that includes a non-confidential topic that is associated with the non-confidential second text based upon the identified first conversion model and the identified non-confidential topic associated with the non-confidential second text.

6. The computer-implemented method of claim 1, wherein converting the received confidential first text into a third text that includes a non-confidential topic that is associated with the non-confidential second text based upon the identified first conversion model further includes, one or a combination of:

identifying, by the one or more computer processors, one or more entities, relations, co-references, and events included in the received confidential first text; and converting, by the one or more computer processors, the one or more entities, relations, co-references, and events into the third text that includes a non-confidential topic that is associated with the non-confidential second text based upon the identified first conversion model.

7. The computer-implemented method of claim 2, wherein converting (i) the third text and (ii) the second text into an original coherent message based upon a second conversion model that includes, one or a combination of:

identifying, by the one or more computer processors, the creator corresponding to the third text;

identifying, by the one or more computer processors, a second conversion model that corresponds to text received from the creator;

determining, by the one or more computer processors, that the non-confidential portion of the third text includes converted confidential first text; and generating, by the one or more computer processors, an original message that includes, one or a combination of, (i) identified confidential first text that is converted into non- confidential third text associated with the non-confidential second text topic, (ii) identified non-confidential second text, and (iii) the identified second conversion model, which correspond to text received from the creator.

8. A computer program product for hiding confidential text within non-confidential text, the computer program product comprising:

one or more computer readable storage media, the program instructions comprising:

program instructions to receive the text that includes (i) a first text and (ii) a second text, wherein at least a portion of the received first text is confidential and at least a portion of the received second text is non-confidential;

program instructions to identify an intended recipient of the received text;

program instructions to determine one or more entities contained within (i) the received first text and (ii) the received second text;

program instructions to analyze the one or more entities, wherein the one or more entities comprise one or more topics;

program instructions to identify a first conversion model, which corresponds to text between the intended recipient and a creator of the text, wherein the conversion model is based on a non-confidential topic contained within the second text as well as the intended recipient; and program instructions to convert the received first text into a third text that has a similar topic to the non-confidential second text topic, wherein converting replaces a confidential first text with coherent non-confidential text associated with the non-confidential topic.

9. The computer program product of claim 8, the program instructions further comprising:
  program instructions to receive the text that includes, one or a combination of, (i) the confidential first text and (ii) the non-confidential second text;
  program instructions to analyze the received text; and
  program instructions to identify (i) the identified recipient of the text and (ii) the creator of the text.

10. The computer program product of claim 8, the program instructions further comprising:
  program instruction to identify a text document;
  program instructions to identify (i) one or more confidential first text and (ii) one or more non-confidential second text contained within the text document;
  program instructions to separate the identified text document into (i) one or more portions of confidential first text and (ii) one or more portions of non-confidential second text;
  program instructions to classify (i) the one or more portions of confidential first text into one or more topics and (ii) the one or more portions of non-confidential second text into one or more topics; and
  program instructions to generate one or more text conversion models based upon, one or a combination of, (i) the separated one or more portions of confidential first text, (ii) the separated one or more portions of non-confidential text, and (iii) the classified one or more topics, wherein the one or more text conversion models use a statistical language model to create one or more versions of converted text.

11. The computer program product of claim 10, wherein one or more topics are generic classifications for types of related text.

12. The computer program product of claim 8, wherein converting, by the one or more computer processors, the received confidential first text into the third text that includes a non-confidential topic that is associated with the non-confidential second text based upon the identified first conversion model includes, one or a combination of:
  program instructions to identify a non-confidential topic for the third text associated with the non-confidential second text; and
  program instructions to convert the received first text into the third text that includes a non-confidential topic that is associated with the non-confidential second text based upon the identified first conversion model and the identified non-confidential topic associated with the non-confidential second text.

13. The computer program product of claim 8, wherein converting the received confidential first text into a third text that includes a non-confidential topic that is associated with the non-confidential second text based upon the identified first conversion model further includes, one or a combination of:
  program instructions to identify one or more entities, relations, co-references, and events included in the received confidential first text; and
  program instructions to convert the one or more entities, relations, co-references, and events into the third text that includes a non-confidential topic that is associated with the non- confidential second text based upon the identified first conversion model.

14. The computer program product of claim 9, wherein converting (i) the third text and (ii) the second text into an original coherent message based upon a second conversion model that includes, one or a combination of:
  program instructions to identify the creator corresponding to the third text;
  program instructions to identify a second conversion model that corresponds to text received from the creator;
  program instructions to determine that the non-confidential portion of the third text includes converted confidential first text; and
  program instructions to generate an original message that includes, one or a combination of, (i) identified confidential first text that is converted into non-confidential third text associated with the non-confidential second text topic, (ii) identified non-confidential second text, and (iii) the identified second conversion model, which correspond to text received from the creator.

15. A computer system for hiding confidential text within non-confidential text, the computer system comprising:
  one or more computer processors;
  one or more computer readable storage medium; and
  program instructions stored on the computer readable storage medium for execution by at least one of the one or more processors, the program instructions comprising:
    program instructions to receive a text that includes (i) a first text and (ii) a second text, wherein at least a portion of the received first text is confidential and at least a portion of the received second text is non-confidential;
    program instructions to identify an intended recipient of the received text;
    program instructions to determine one or more entities contained within (i) the received first text and (ii) the received second text;
    program instructions to analyze the one or more entities, wherein the one or more entities comprise one or more topics;
    program instructions to identify a first conversion model, which corresponds to text between the intended recipient and a creator of the text, wherein the conversion model is based on a non-confidential topic contained within the second text as well as the intended recipient; and
    program instructions to convert the received first text into a third text that has a similar topic to the non-confidential second text topic, wherein converting replaces a confidential first text with coherent non-confidential text associated with the non-confidential topic.

16. The computer system of claim 15, the program instructions further comprising:
  program instructions to receive the text that includes, one or a combination of, (i) the confidential first text and (ii) the non-confidential second text;
  program instructions to analyze the received text; and
  program instructions to identify (i) the identified recipient of the text and (ii) the creator of the text.

17. The computer system of claim 15, the program instructions further comprising:
  program instruction to identify the text document;
  program instructions to identify (i) one or more confidential first text and (ii) one or more non-confidential second text contained within the text document;
  program instructions to separate the identified text document into (i) one or more portions of confidential first text and (ii) one or more portions of non-confidential second text;

program instructions to classify (i) the one or more portions of confidential first text into one or more topics and (ii) the one or more portions of non-confidential second text into one or more topics; and program instructions to generate one or more text conversion models based upon, one or a combination of, (i) the separated one or more portions of confidential first text, (ii) the separated one or more portions of non-confidential text, and (iii) the classified one or more topics, wherein the one or more text conversion models use a statistical language model to create one or more versions of converted text.

18. The computer system of claim 15, wherein converting, by the one or more computer processors, the received confidential first text into the third text that includes a non-confidential topic that is associated with the non-confidential second text based upon the identified first conversion model includes, one or a combination of:

program instructions to identify a non-confidential topic for the third text associated with the non-confidential second text; and program instructions to convert the received first text into the third text that includes a non-confidential topic that is associated with the non-confidential second text based upon the identified first conversion model and the identified non-confidential topic associated with the non-confidential second text.

19. The computer system of claim 15, wherein converting the received confidential first text into a third text that includes a non-confidential topic that is associated with the non-confidential second text based upon the identified first conversion model further includes, one or a combination of:

program instructions to identify one or more entities, relations, co-references, and events included in the received confidential first text; and program instructions to convert the one or more entities, relations, co-references, and events into the third text that includes a non-confidential topic that is associated with the non-confidential second text based upon the identified first conversion model.

20. The computer system of claim 16, wherein converting (i) the third text and (ii) the second text into an original coherent message based upon a second conversion model that includes, one or a combination of:

program instructions to identify the creator corresponding to the third text;

program instructions to identify a second conversion model that corresponds to text received from the creator;

program instructions to determine that the non-confidential portion of the third text includes converted confidential first text; and program instructions to generate an original message that includes, one or a combination of, (i) identified confidential first text that is converted into non-confidential third text associated with the non-confidential second text topic, (ii) identified non-confidential second text, and (iii) the identified second conversion model, which correspond to text received from the creator.

* * * * *